(12) United States Patent
Kim et al.

(10) Patent No.: US 11,947,720 B2
(45) Date of Patent: Apr. 2, 2024

(54) INTELLIGENT BARRIER-FREE KIOSK AND METHOD OF CONTROLLING THE SAME

(71) Applicant: DOT INCORPORATION, Seoul (KR)

(72) Inventors: Ju Yoon Kim, Gyeonggi-do (KR); Ji Ho Kim, Gyeonggi-do (KR); Hyeon Cheol Park, Gyeonggi-do (KR)

(73) Assignee: DOT INCORPORATION, Seoul (KR)

( * ) Notice: Subject to any disclaimer, the term of this patent is extended or adjusted under 35 U.S.C. 154(b) by 0 days.

(21) Appl. No.: 17/977,442

(22) Filed: Oct. 31, 2022

(65) Prior Publication Data

US 2023/0195219 A1  Jun. 22, 2023

(30) Foreign Application Priority Data

Dec. 21, 2021 (KR) .......... 10-2021-0184245
Dec. 22, 2021 (KR) .......... 10-2021-0185482

(51) Int. Cl.
| | |
|---|---|
| *G06F 3/01* | (2006.01) |
| *F16M 11/04* | (2006.01) |
| *G06V 10/774* | (2022.01) |
| *G06V 40/20* | (2022.01) |
| *F16M 11/18* | (2006.01) |

(52) U.S. Cl.
CPC .......... *G06F 3/013* (2013.01); *F16M 11/046* (2013.01); *G06V 10/774* (2022.01); *G06V 40/23* (2022.01); *F16M 11/18* (2013.01)

(58) Field of Classification Search
CPC .... G06V 40/23; G06V 10/774; F16M 11/046; F16M 11/18; G06F 3/013
See application file for complete search history.

(56) References Cited

U.S. PATENT DOCUMENTS

| | | | |
|---|---|---|---|
| 2004/0133586 A1* | 7/2004 | Ceballos Counago | ...................... G07F 17/0014 707/999.102 |
| 2010/0328492 A1* | 12/2010 | Fedorovskaya | ........ G06Q 30/02 348/231.2 |
| 2012/0293642 A1* | 11/2012 | Berini | .................. G06V 40/197 348/77 |

FOREIGN PATENT DOCUMENTS

| | | |
|---|---|---|
| KR | 20110107951 A | 10/2011 |
| KR | 20210000078 A | 1/2021 |
| KR | 10-2330793 B1 | 11/2021 |

OTHER PUBLICATIONS

Office Action issued in KR Application No. 10-2021-0184245 dated Sep. 6, 2023.
Office Action issued in KR Application No. 10-2021-0185482 dated Sep. 6, 2023.

* cited by examiner

*Primary Examiner* — Stephen G Sherman
(74) *Attorney, Agent, or Firm* — Sughrue Mion, PLLC

(57) ABSTRACT

Provided is a method of controlling an intelligent barrier-free kiosk including: recognizing a moving object, which is within a preset distance from the kiosk and is approaching the kiosk; learning characteristic information of the recognized moving object; determining, based on a result of the learning, whether a user related to the moving object intends to use the kiosk; and, based on determining that the user intends to use the kiosk, changing a height of the kiosk.

9 Claims, 14 Drawing Sheets

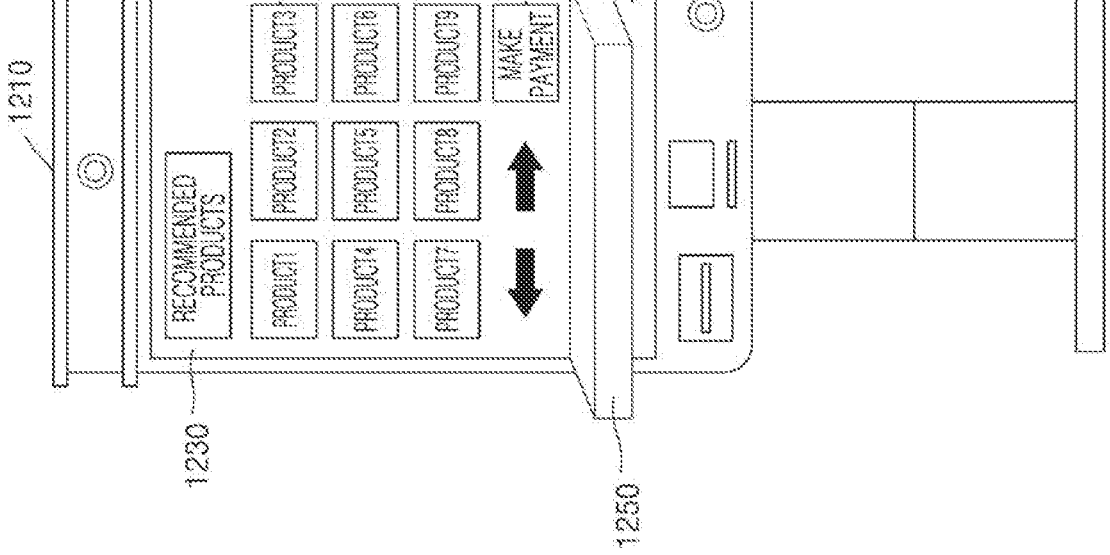
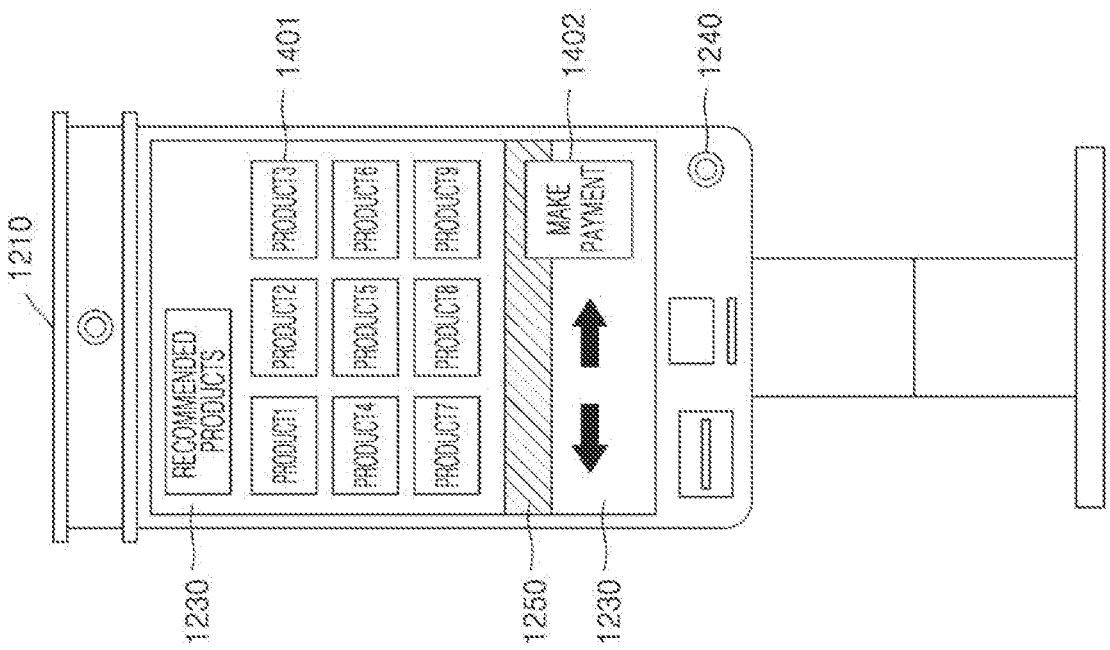

INTELLIGENT BARRIER-FREE KIOSK AND METHOD OF CONTROLLING THE SAME

CROSS-REFERENCE TO RELATED APPLICATIONS

This application is based on and claims priority under 35 U.S.C. § 119 to Korean Patent Application No. 10-2021-0184245 filed on Dec. 21, 2021 and No. 10-2021-0185482 filed on Dec. 22, 2021, in the Korean Intellectual Property Office, the disclosure of which is incorporated by reference herein in its entirety.

BACKGROUND

1. Field

The present disclosure relates to a kiosk and a method of controlling the kiosk, and more particularly, to an intelligent barrier-free kiosk capable of appropriately operating in response to an approaching user, and a method of controlling the intelligent barrier-free kiosk.

2. Description of the Related Art

The term 'kiosk' refers to a device that is installed to be fixed at a certain location and may receive a user's input and output various pieces of information. Kiosks may be classified, depending on their implementations, into self-ordering machines that receive a user's input and automatically process a product order procedure, and interactive kiosks that receive a user's input and display information.

Kiosks have been generally installed inside places of business to reduce labor costs, but as non-face-to-face services have increased significantly due to COVID-19, a significant number of kiosks have been installed in various places to efficiently provide information, as well as places of business for selling products.

In particular, as access to smart devices has been greatly expanded, barrier-free kiosks designed for the disabled or the elderly who have difficulty in quickly perceiving information are also coming into widespread use, and barrier-free kiosks typically include a height adjustment function.

A barrier-free kiosk with a height adjustment function implements height adjustment with a stepping motor or a sliding rail, and, as its height is repeatedly adjusted according to inputs of numerous users, the stepping motor or the sliding rail of the barrier-free kiosk may frequently break down.

SUMMARY

The present disclosure is to provide a barrier-free kiosk configured to adjust its height only when necessary.

In addition, the present disclosure is to provide a kiosk capable of improving convenience according to a user's physical condition.

Additional aspects will be set forth in part in the description which follows and, in part, will be apparent from the description, or may be learned by practice of the presented embodiments of the present disclosure.

According to an embodiment of the present disclosure, provided is a method of controlling an intelligent barrier-free kiosk including: recognizing a moving object, which is within a preset distance from the kiosk and is approaching the kiosk; learning characteristic information of the recognized moving object; determining, based on a result of the learning, whether a user related to the moving object intends to use the kiosk; and, based on determining that the user intends to use the kiosk, changing a height of the kiosk.

In the method, the learning may include learning the characteristic information based on information obtained by photographing the moving object by using at least one camera included in the kiosk.

In the method, the learning may include learning the characteristic information based on information obtained by photographing the moving object by using at least one of cameras installed on a front and a side of the kiosk.

In the method, the moving object may be the user, and the recognized characteristic information of the moving object may be a height of the user.

In the method, the moving object may be the user, and the recognized characteristic information of the moving object may be information about eyes of the user.

In the method, the information about the eyes may include at least one of information about an iris and focus information with respect to the kiosk.

In the method, the changing of the height may include: calculating, based on the result of the learning, a height optimized for the user; and adjusting the height of the kiosk to be the calculated height.

In the method, the characteristic information of the recognized moving object may include information about a front of the recognized moving object and information about other than the front of the recognized moving object, and the determining of whether the user intends to use the kiosk may include determining, based on a ratio between the information about the front and the information about other than the front, whether the user intends to use the kiosk.

In the method, the characteristic information of the recognized moving object may include information about a front of the recognized moving object and information about other than the front of the recognized moving object, and the determining of whether the user intends to use the kiosk may include determining, based on an amount of the information about other than the front, whether the user intends to use the kiosk.

According to another embodiment of the present disclosure, provided is a kiosk including a camera and a processor, wherein the camera is configured to recognize and photograph a moving object, which is within a preset distance from the kiosk and is approaching the kiosk, and the processor is configured to learn characteristic information of the recognized moving object, determine, based on a result of the learning, whether a user related to the moving object intends to use the kiosk, and, based on determining that the user intends to use the kiosk, change a height of the kiosk.

In the kiosk, the processor may be further configured to learn the characteristic information based on information obtained by photographing the moving object by using at least one camera included in the kiosk.

In the kiosk, the processor may be further configured to learn the characteristic information based on information obtained by photographing the moving object by using at least one of cameras installed on a front and a side of the kiosk.

In the kiosk, the moving object may be the user, and the recognized characteristic information of the moving object may be a height of the user.

In the kiosk, the moving object may be the user, and the recognized characteristic information of the moving object may be information about eyes of the user.

In the kiosk, the information about the eyes may include at least one of information about an iris and focus information with respect to the kiosk.

In the kiosk, the processor may be further configured to calculate, based on the result of the learning, a height optimized for the user, and adjust the height of the kiosk to be the calculated height.

In the kiosk, the characteristic information of the recognized moving object may include information about a front of the recognized moving object and information about other than the front of the recognized moving object, and the processor may be further configured to determine, based on a ratio between the information about the front and the information about other than the front, whether the user intends to use the kiosk.

In the kiosk, the characteristic information of the recognized moving object may include information about a front of the recognized moving object and information about other than the front of the recognized moving object, and the processor may be further configured to determine, based on an amount of the information about other than the front, whether the user intends to use the kiosk.

According to an embodiment of the present disclosure, provided is a computer-readable recording medium having recorded thereon a program for executing the method.

According to another embodiment of the present disclosure, provided is a method including: obtaining user approach information from a first sensor; obtaining a height value of the user from a second sensor; matching the height value of the user with one of preset height value ranges; and determining a height of the kiosk corresponding to the height value range matched with the height value.

In the method, the height of the kiosk corresponding to the height value range matched with the height value may be determined based on a position of an input pad unit provided in the kiosk.

In the method, the determining of the height of the kiosk may include: obtaining the position of the input pad unit and determining a height adjustment value of the kiosk corresponding to the obtained position; determining a height of the kiosk by applying the height adjustment value to the height of the kiosk corresponding to the height value range matched with the height value.

In the method, the determining of the height of the kiosk may include: calculating, based on the position of the input pad unit, a height difference between the height value of the user and the height of the input pad unit; matching the height difference value with one of preset height ranges, and determining a kiosk height adjustment value corresponding to the height range matched with the height difference value; and determining the height of the kiosk by applying the height adjustment value to the height of the kiosk corresponding to the height range matched with the height difference value.

The method may further include: after the determining of the height of the kiosk, receiving a signal for requesting protrusion of the input pad unit provided in the kiosk, and generating a signal for protrusion of the input pad unit; and determining, based on the user approach information, an inclination of the protruding input pad unit.

In the method, the determining of the inclination of the input pad unit may include calculating, based on the user approach information, a height and an arm length of the user, and determining, based on the height of the kiosk and the height and the arm length of the user, an angle of the protruding input pad unit.

The method may further include: after the determining of the height of the kiosk, determining whether there is a change in the approach information; and, when there is a change in the approach information, redetermining the height of the kiosk based on the change.

In the method, the approach information may include user detection information for the user who is within a preset radius, and a distance between the user and the kiosk.

According to another embodiment of the present disclosure, provided is a server for providing an operation method of a kiosk device including: a communication unit configured to perform communication; a memory storing at least one program; and a processor configured to execute the at least one program to perform an operation, wherein the processor is further configured to execute the at least one program to obtain user approach information from a first sensor, obtain a height value of a user from a second sensor, match the height value of the user with one of preset height value ranges, and determine a height of the kiosk corresponding to the height value range matched with the height value.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 is a diagram illustrating an interface screen of a display of a kiosk according to whether an input pad protrudes, according to an embodiment of the present disclosure.

DETAILED DESCRIPTION

Figure 1:
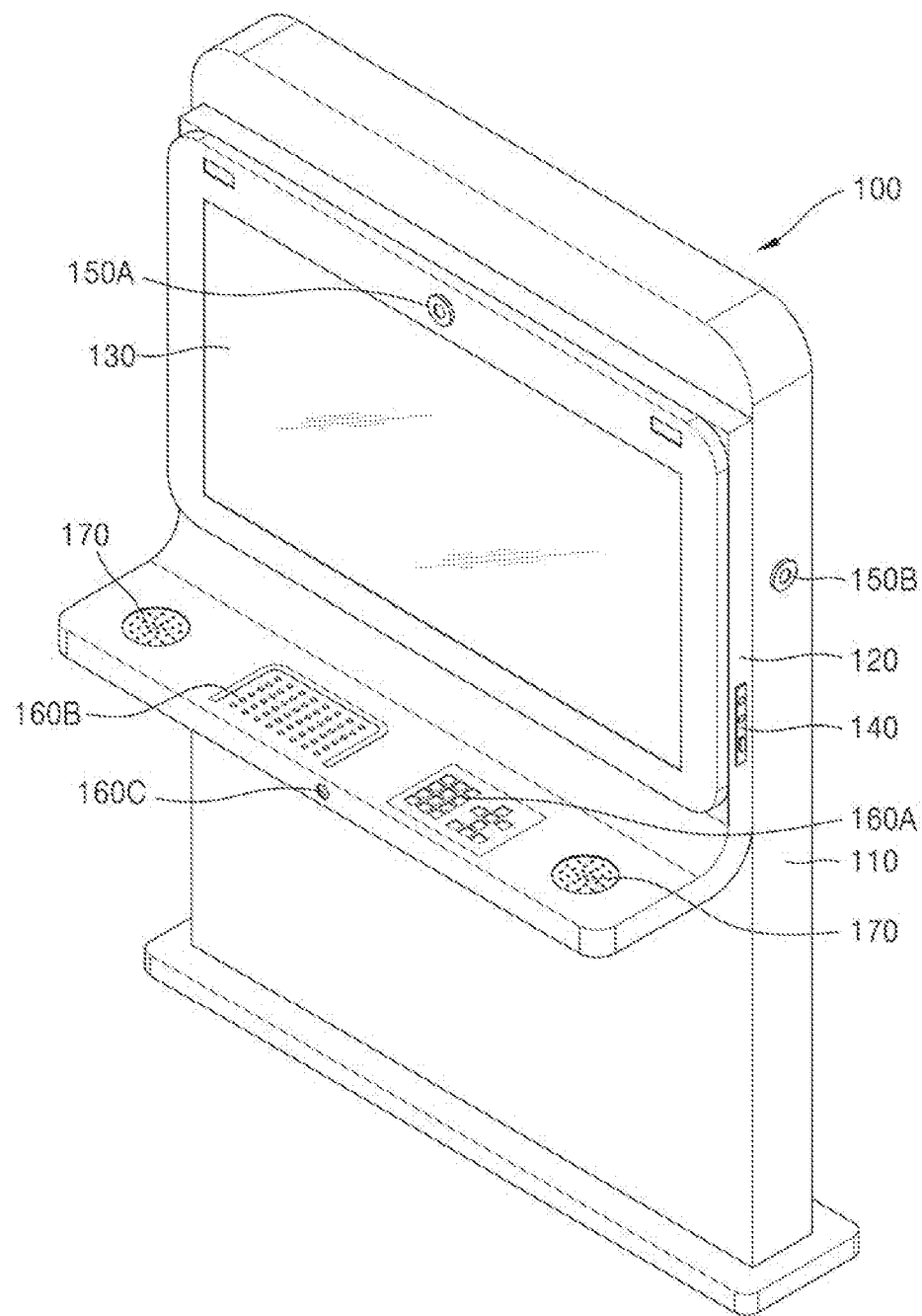
FIG. 1 is a diagram schematically illustrating the overall appearance of an example of a kiosk according to the present disclosure.

As the present disclosure allows for various changes and numerous embodiments, particular embodiments will be illustrated in the drawings and described in detail. The effects and features of the present disclosure and methods of achieving them will become clear with reference to the embodiments described in detail below with the drawings. However, the present disclosure is not limited to the embodiments disclosed below, and may be implemented in various forms.

Hereinafter, embodiments of the present disclosure will be described in detail with reference to the accompanying drawings, and the same or corresponding components will be denoted by the same reference numerals when described with reference to the accompanying drawings, and thus their descriptions that are already provided will be omitted.

As used herein, terms such as "first," "second," etc., are used only to distinguish one component from another, and such components must not be limited by these terms.

The singular expression used herein also includes the plural meaning as long as it is not inconsistent with the context.

The terms "comprises," "includes," "has", and the like used herein specify the presence of stated features or components, but do not preclude the presence or addition of one or more other features or components.

When a certain embodiment may be differently implemented, specific operations may be performed differently from the sequence described herein. For example, two processes, which are successively described herein, may be substantially simultaneously performed, or may be performed in a process sequence opposite to a described process sequence.

Hereinafter, unless otherwise specified, the term 'kiosk' is considered as an intelligent barrier-free kiosk.

FIG. 1 is a diagram schematically illustrating the overall appearance of an example of a kiosk according to the present disclosure.

Referring to FIG. 1, a kiosk 100 according to the present invention includes a stand 110, a main module 120, a display unit 130, a height adjustment unit 140, a front camera 150A, a first side camera 150B, a first input device 160A, a second input device 160B, a third input device 160C, and a sound output unit 170. Although not shown in FIG. 1, the kiosk 100 may further include a second side camera (not shown) on a side opposite to the first side camera 150B. FIG. 1 schematically illustrates only the components of the kiosk 100 necessary to implement the present disclosure, and in an actual implementation of the present disclosure, more modules than those illustrated in FIG. 1 may be further included.

The stand 110 may determine the overall height of the kiosk 100, and may be electrically connected to the main module 120 to supply power to the main module 120.

Although not shown in FIG. 1, the stand 110 may include a battery or a power cable therein or outside for supplying power to the main module 120. In addition, the stand 110 may supply power to the first side camera 150B and the second side camera 150C, and may collect images captured by the first side camera 150B and the second side camera 150C, and transmit the images to the main module 120.

The main module 120 is electrically connected to the stand 110 to receive power, and includes various input/output devices for performing the function of a kiosk. In detail, the main module 120 may include the display unit 130, the height adjustment unit 140, the front camera 150A, the first side camera 150B, the first input device 160A, the second input device 160B, the third input device 160C and the sound output unit 170, and according to an embodiment, at least one of the above-described modules may be omitted.

The main module 120 electrically connected to the stand 110 may be moved up or down by the height adjustment unit 140 to be described below.

The display unit 130 may visually output a result of processing by the main module 120. In detail, the display unit 130 may be, but is not limited to, any one of a cathode-ray tube (CRT) display, a liquid-crystal display (LCD), a plasma display panel (PDP), a light-emitting diode (LED) display, an organic LED (OLED) display, a field-emission display (FED), a vacuum fluorescent display (VFD), an electrophoretic display (EPD), an electrochromic display (ECD), and an electroluminescent display (ELD), for outputting a result of processing by the main module 120. According to an embodiment, the display unit 130 may be implemented as a touchscreen display to also function as an input device, in which case, the first input device 160A may be omitted from the kiosk 100.

The height adjustment unit 140 refers to a module that adjusts the distance between the ground and the lower end of the main module 120 by adjusting the position of the main module 120 in the vertical direction in a state in which the main module 120 is electrically connected to the stand 110. For convenience of description, in the present disclosure, the distance between the ground and the lower end of the main module 120 may be simply referred to as 'the height of the main module 120'. The height of the main module 120 may vary depending on characteristic information of a user using the kiosk. For example, in a case in which the height of the user using the kiosk is 1.8 m, the height adjustment unit 140 may raise the height of the main module 120 to match the height of the user, and, in a case in which the height of the user using the kiosk is 1.4 m, the height adjustment unit 140 may lower the height of the main module 120 to match the height of the user.

The front camera 150A may photograph an object in front of the kiosk 100, and transmit a result of the photographing to a processor (not shown) included in the main module 120. Although FIG. 1 illustrates that the front camera 150A is included in the main module 120, according to an embodiment, the front camera 150A may be included in the stand 110.

Each of the first side camera 150B and the second side camera (not shown) may photograph an object located on the side of the kiosk 100, and transmit a result of the photographing to the processor (not shown) included in the main module 120. Although it is described above that the first side camera 150B and the second side camera (not shown) are included in the stand 110, according to an embodiment, the first side camera 150B and the second side camera (not shown) may be installed at sides of the main module 120, respectively. In addition, although not shown in FIG. 1, a rear camera (not shown) may be further installed at the rear of the kiosk 100.

The first input device 160A refers to a keypad that converts a physical input by the user into an electrical signal, and transmits the electrical signal to the processor (not shown). The first input device 160A is an input device used by general users, and although FIG. 1 illustrates that a total of 20 keys are included in the first input device 160A, the number of keys included in the first input device 160A is not limited thereto.

The second input device 160B refers to a braille pad that converts a physical input by the user into an electrical signal and transmits the electrical signal to the processor (not shown). The second input device 160B may be effectively used by a visually impaired person, and for convenience of description, it is named as 'input device', but may actually include an output function as well as an input function. For example, the second input device 160B outputs braille corresponding to a result of processing by the main module 120 such that a visually impaired person recognizes content output from the kiosk 100. Structural features of the second input device 160B will be described in detail with reference to FIG. 5.

The third input device 160C refers to an input device that converts a voice input by the user into an electrical signal and transmits the electrical signal to the processor (not shown). For example, the third input device 160C may be a microphone.

The sound output unit 170 refers to a device that outputs a result of processing by the main module 120, as a sound such as a voice or a sound effect. Although FIG. 1 illustrates that the main module 120 includes two sound output units 170 symmetric with each other, according to an embodiment, the main module 120 may include fewer or more sound output units 170. Also, the sound output unit 170 may be implemented to be included in the stand 110 instead of the main module 120. In particular, the sound output unit 170 may be an effective output unit for a visually impaired person.

Although FIG. 1 illustrates that the height adjustment unit 140 is implemented with a sliding rail such that the height of the stand 110 is not changed even when the entire main module 120 is vertically moved by the height adjustment unit 140, according to another embodiment of the present disclosure, the height adjustment unit 140 may be implemented with a stepping motor in a state in which the stand 110 and the main module 120 are integrated with each other, such that the overall height of the stand 110 is changed according to the height adjusted by the height adjustment unit 140.

Figure 2:
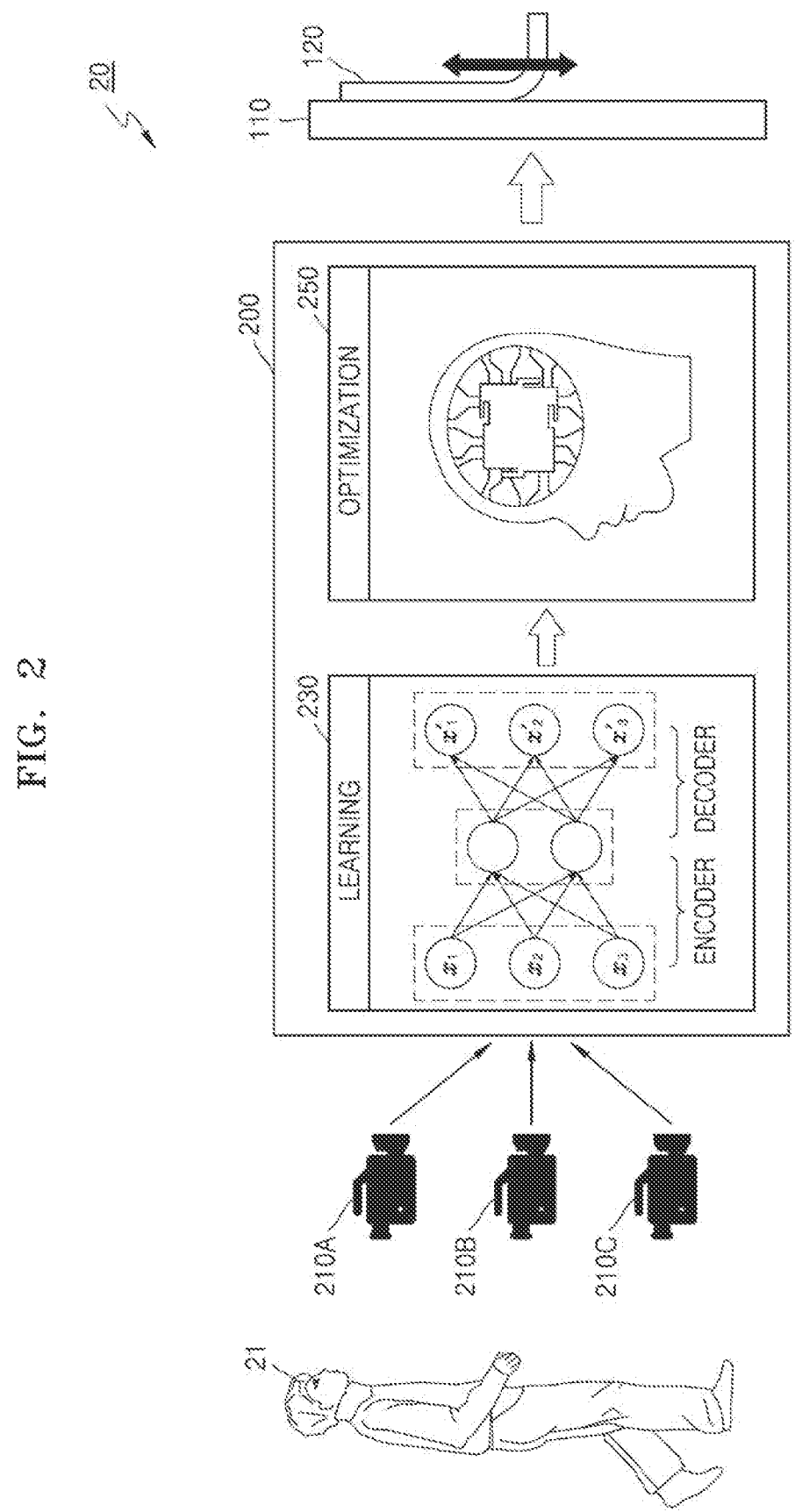
FIG. 2 is a conceptual diagram schematically illustrating an operation method of a kiosk according to the present disclosure.

FIG. 2 is a conceptual diagram schematically illustrating an operation method of a kiosk according to the present disclosure.

Referring to FIG. 2, an entire kiosk system 20 adjusts the height of the main module 120 included in the kiosk 100 by recognizing a moving object 21 approaching the kiosk 100 by using a plurality of cameras 210A, 210B, and 210C, and processing a result of the recognizing. Hereinafter, descriptions will be provided with reference to FIG. 1.

In FIG. 2, the moving object 21 may generally be a person, but may not be a person according to an embodiment, which will be described below with reference to FIG. 8. The moving object 21 is basically moving, and the distance between the moving object 21 and the kiosk 100 may increase or decrease according to the movement of the moving object 21.

In FIG. 2, the plurality of cameras 210A, 210B, and 210C are provided in the kiosk 100 and are able to photograph the moving object 21. The plurality of cameras 210A, 210B, and 210C may be the front camera 150A, the first side camera 150B, and the second side camera (not shown) described above with reference to FIG. 1, but are not limited thereto. For example, in order to accurately recognize the moving object 21, the plurality of cameras 210A, 210B, and 210C may be three front cameras 150A.

A control system 200 receives and processes images captured by the plurality of cameras 210A, 210B, and 210C. The control system 200 may include a learning module 230 and an optimization module 250.

The learning module 230 determines whether the moving object 21 intends to use the kiosk 100, by learning, through a learning model, the images captured by the plurality of cameras 210A, 210B, and 210C. For example, the learning module 230 may determine that a first moving object intends to use the kiosk 100 and the second moving object does not intend to use the kiosk 100. The learning module 230 may include various learning models for performing such learning.

For example, as illustrated in FIG. 2, the learning module 230 may include an autoencoder model as a learning model, and may learn input image data through a learning process in layers including an input layer, a hidden layer, and an output layer, and determine whether the moving object 21 intends to use the kiosk 100. In FIG. 2, the learning module 230 may use, rather than an autoencoder, one or more of an artificial neural network (ANN), a recursive neural network (RNN), a hidden Markov model (HMM), k-means clustering, k-nearest neighbors, and a support vector machine (SVM), but is not limited thereto.

Although not shown in FIG. 2, the images captured by the plurality of cameras 210A, 210B, and 210C may be pre-processed according to the characteristics of the learning model, before being input to the learning module 230. For example, images captured by the plurality of cameras 210A, 210B, and 210C at regular time intervals may be pre-processed into time-series vector data, then the time-series vector data may be input, as input data, to an HMM specialized for time-series vector data, and thus, the learning module 230 may effectively learn the images.

When the learning module 230 determines that the moving object 21 intends to use the kiosk 100, the optimization module 250 may optimize the height of the kiosk 100 according to collected characteristics of the moving object 21. In detail, the optimization module 250 may adjust the height of the kiosk 100 in order to optimize the height to be at which the moving object may use the kiosk 100 most comfortably, and may calculate a displacement value for changing the current height to the optimized height.

Finally, when the optimized height of the kiosk 100 is determined by the optimization module 250, the height of the main module 120 of the kiosk 100 may be adjusted to the determined height. Although FIG. 2 illustrates that the kiosk 100 is a sliding rail-type kiosk for convenience of description, it is described above that the kiosk according to the present disclosure may implement a height adjustment function by using a stepping motor.

Figure 3:
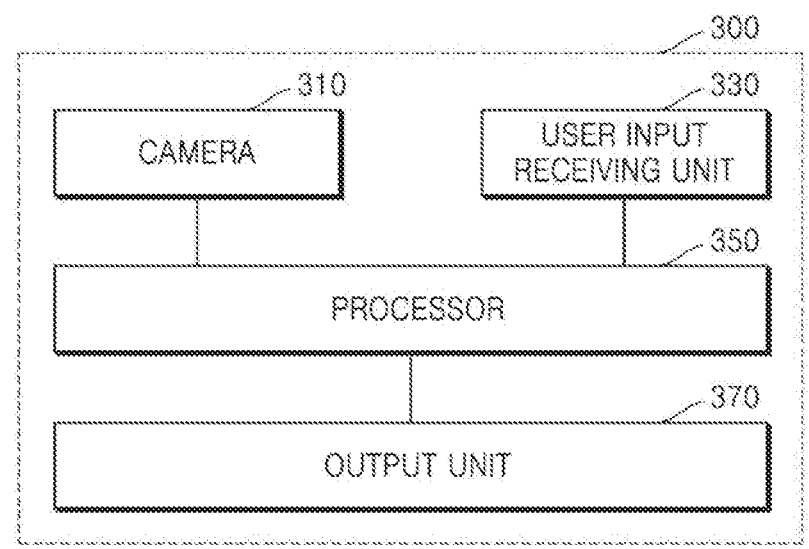
FIG. 3 is a block diagram illustrating an example of a control system of FIG. 2.

FIG. 3 is a block diagram illustrating an example of the control system described above with reference to FIG. 2.

A control system 300 of FIG. 3 is an example of the control system 200 of FIG. 2, and is implemented to be physically or logically included in the main module 120 described above with reference to FIG. 1, to perform a function of controlling the operation of the main module 120 and various input/output devices included in the main module 120. According to an embodiment, the control system 300 of FIG. 3 may be implemented to be included in the stand 110 instead of the main module 120.

Referring to FIG. 3, the control system 300 according to the present disclosure includes a camera 310, a user input receiving unit 330, a processor 350, and an output unit 370.

The control system 300 according to an embodiment of the present disclosure may correspond to one or more processors, or may include one or more processors.

Accordingly, the control system 300 and the camera 310, the user input receiving unit 330, the processor 350, and the output unit 370 included in the control system 300 may be driven in a form included in a hardware device such as a microprocessor or a general-purpose computer system.

Each module included in the control system 300 illustrated in FIG. 3 is arbitrarily named in order to intuitively describe the representative function performed by the module, and in an actual implementation of the control system 300, each module may be named differently from as illustrated in FIG. 3.

In addition, the number of modules included in the control system 300 of FIG. 3 may vary according to an embodiment. In more detail, although FIG. 3 illustrates that the control system 300 includes a total of four modules, according to an embodiment, two or more modules may be integrated into one module, or one or more modules may be separated into two or more modules.

The camera 310 recognizes and photographs a moving object that is within a preset distance from the kiosk 100, and is approaching the kiosk 100. An image captured by the camera 310 is transmitted to the processor 350, and at least one camera 310 may be provided.

The user input receiving unit 330 receives a user input to the kiosk 100, and transmits the received input to the processor 350. The user input receiving unit 330 may be connected, by wire or wirelessly, to the first input device 160A, the second input device 160B, and the third input device 160C, which are described above with reference to FIG. 1.

The processor 350 receives various pieces of data from the camera 310 and the user input receiving unit 330, and processes them.

For example, the processor 350 may learn characteristic information of the moving object recognized by one or more cameras 310, and determine, based on a result of the learning, whether a user related to the moving object intends to use the kiosk 100. In this case, the moving object may or may not be a user. In a case in which the user is a visually impaired person moving with a walking stick, the moving object recognized by the camera 310 may be the walking stick, and the processor 350 may recognize both the walking stick and the user using the walking stick. In a case in which the user is a visually impaired person moving with a guide dog, the moving object recognized by the camera 310 may be the guide dog, and the processor 350 may recognize both the guide dog and the user with the guide dog.

As another example, the processor 350 may analyze the image captured by the camera 310 to identify at least one of the user's height, information about the user's eyes, and information about the user's arm length, and learn based on the identified information to determine whether the user intends to use the kiosk 100. When the user's height in captured images gradually increases over time, the processor 350 may determine that the user is approaching the kiosk 100. When the user's iris matches the kiosk 100 or the user's focus is on the kiosk 100, the processor 350 may determine that the user is approaching the kiosk 100. In a similar manner, the processor 350 may determine, based on the overall length of the user's arm and a change in the user's arm length in the captured images, that the user is approaching the kiosk 100.

Whether the user is approaching the kiosk 100 and whether the user intends to use the kiosk 100 may be determined separately from each other. That is, the processor 350 may primarily determine whether the user is approaching the kiosk 100, secondarily determine whether the determined target (the user) intends to use the kiosk 100, and thus finally determine whether the user intends to use the kiosk 100. Through the above process, the processor 350 may prevent a situation in which the height of the kiosk 100 is unnecessarily adjusted as a user simply approaches the kiosk 100 and then moves away from the kiosk 100 without using the kiosk 100.

The output unit 370 outputs a result of processing by the processor 350 and transmits the result to various modules included in the kiosk 100. For example, when a control signal for adjusting the height of the kiosk 100 is generated by the processor 350, the output unit 370 may output the control signal to transmits it to the height adjustment unit 140, such that the height of the kiosk 100 is changed. As another example, the output unit 370 may transmit result data processed by the processor 350 to the sound output unit 170 such that a voice or a sound is output from the kiosk 100.

Figure 4:
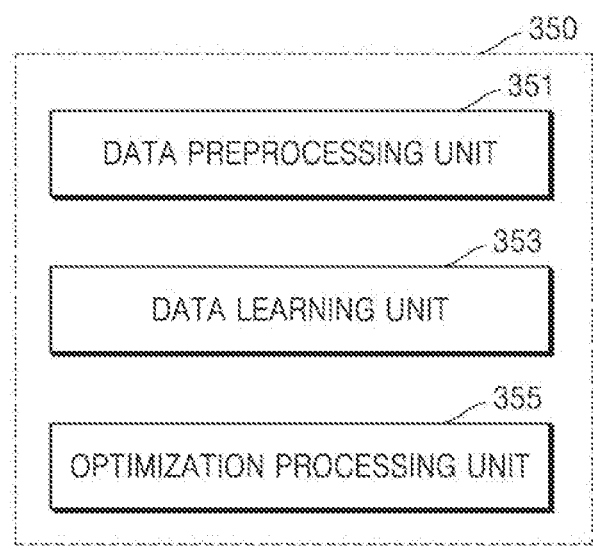
FIG. 4 is a block diagram illustrating in detail another example of a processor of FIG. 3.

FIG. 4 is a block diagram illustrating in detail another example of the processor described above with reference to FIG. 3.

Referring to FIG. 4, the processor 350 includes a data preprocessing unit 351, a data learning unit 353, and an optimization processing unit 355.

The data preprocessing unit 351, the data learning unit 353, and the optimization processing unit 355 of FIG. 4 may correspond to one or more processors or may include one or more processors. The data preprocessing unit 351, the data learning unit 353, and the optimization processing unit 355 of FIG. 4 may be driven in a form included in a hardware device such as a microprocessor or a general-purpose computer system.

Each module included in the processor 350 illustrated in FIG. 4 is arbitrarily named in order to intuitively describe the representative function performed by the module, and in an actual implementation of the processor 350, each module may be named differently from as illustrated in FIG. 4.

In addition, the number of modules included in the processor 350 of FIG. 4 may vary according to an embodiment. In more detail, although FIG. 4 illustrates that the processor 350 includes a total of three modules, according to an embodiment, two or more modules may be integrated into one system-on-chip (SoC), or one or more modules may be separated into two or more modules.

The data preprocessing unit 351 may receive an image received by a camera and perform preprocessing such that learning is efficiently performed by a learning model included in the data learning unit 353. For example, the image received by the camera may be preprocessed into vector data, and when a plurality of cameras are provided in the kiosk 100, images may be preprocessed into a vector corresponding to each camera. In addition, when images of the same moving object are received over several viewpoints, the data preprocessing unit 351 may preprocess several images into one time-series vector.

The data learning unit 353 receives preprocessed data from the data preprocessing unit 351 and performs learning processing based on a pre-stored learning model. The data learning unit 353 includes one or more learning models, and the data preprocessing unit 351 may calculate various types of preprocessed data according to the type of the learning model stored in the data learning unit 353. Although not shown in FIG. 4, the data learning unit 353 may include a database (not shown) that stores various parameters used by the learning models and parameters updated by the learning models.

The data learning unit 353 may determine whether a user related to a moving object, which is recognized and photographed by the camera through a series of processes, intends to use the kiosk 100.

According to an embodiment, characteristic information of the moving object recognized by the camera may include information about the front of the moving object (hereinafter, referred to as 'frontal information') and information about other than the front of the moving object (hereinafter, referred to as 'non-frontal information'), and the data learning unit 353 may determine whether the user intends to use the kiosk 100 based on a ratio between the frontal information and the non-frontal information. The data learning unit 353 may analyze a video captured by the camera to calculate a ratio by counting the number of frames in which a moving object is approaching the front of the kiosk 100, and the number of frames in which the moving object is approaching other than the front of the kiosk 100, respectively, determine whether the ratio is greater than a preset reference value, and thus determine whether a user related to the moving object intends to use the kiosk 100.

$$\frac{B}{A} > k_1 \qquad \text{[Equation 1]}$$

Equation 1 is for describing a reference ratio that the processor 350 refers to in determining whether a user intends to use the kiosk 100. In Equation 1, A denotes the number of frames including non-frontal information in a video captured by the camera, B denotes the number of frames including front frontal information in the video captured by the camera, and $k_1$ denotes the reference ratio. When a 3-second video captured by the camera is a 60-fps video, A and B are 18 and 162, respectively, and the reference ratio is 8, the data learning unit 353 may determine that the conditional expression according to Equation 1 is satisfied, and thus determine that the user intends to use the kiosk 100. As another example, when A and B are 80 and 100, respectively, the data learning unit 353 may determine that the conditional expression according to Equation 1 is not satisfied, and thus determine that the user does not intend to use the kiosk 100.

Frontal information and non-frontal information may be calculated in various ways. The data learning unit 353 may include a front determination reference value that may be used to determine, based on a facial direction, iris information, focus information, etc. of the user (or the moving object), whether a user (or a moving object) is facing the front of the kiosk 100 or is facing other than the front of the kiosk 100, and the front determination reference value may be periodically or aperiodically updated according to a learning model. As the front determination reference value is updated in a learning process of the learning model, with the lapse of time, the kiosk according to the present disclosure may be able to more accurately determine the frontal direction (or non-frontal direction) of a moving object and determine whether a user intends to use the kiosk.

According to another embodiment, the data learning unit 353 may determine, based on non-frontal information, whether the user intends to use the kiosk 100.

$$A > k_2 \qquad \text{[Equation 2]}$$

Equation 2 is for describing a reference value that the data learning unit 353 refers to in determining, based on non-frontal information, whether a user intends to use the kiosk. In Equation 2, A denotes the number of frames including non-frontal information of a moving object in a video as in Equation 1, and $k_2$ denotes a reference value. When the number of frames including non-frontal information in received videos each having a constant time length is greater than a reference value, the data learning unit 353 may determine that the user does not intend to use the kiosk 100.

The present disclosure includes various embodiments for determining whether a user intends to use a kiosk in addition to the above-described methods, and the embodiments will be described below with reference to FIGS. 6 to 8.

The optimization processing unit 355 performs processing for changing the height of the kiosk 100 to an optimized height. In detail, when the data learning unit 353 determines that the user intends to use the kiosk 100, the optimization processing unit 355 may primarily calculate the height of the kiosk 100 optimized for the user, secondarily calculate a deviation value for changing the height of the kiosk 100 from the current height of the kiosk 100 to the optimized height of the kiosk 100, and transmit the values to the height adjustment unit 140.

Figure 5:
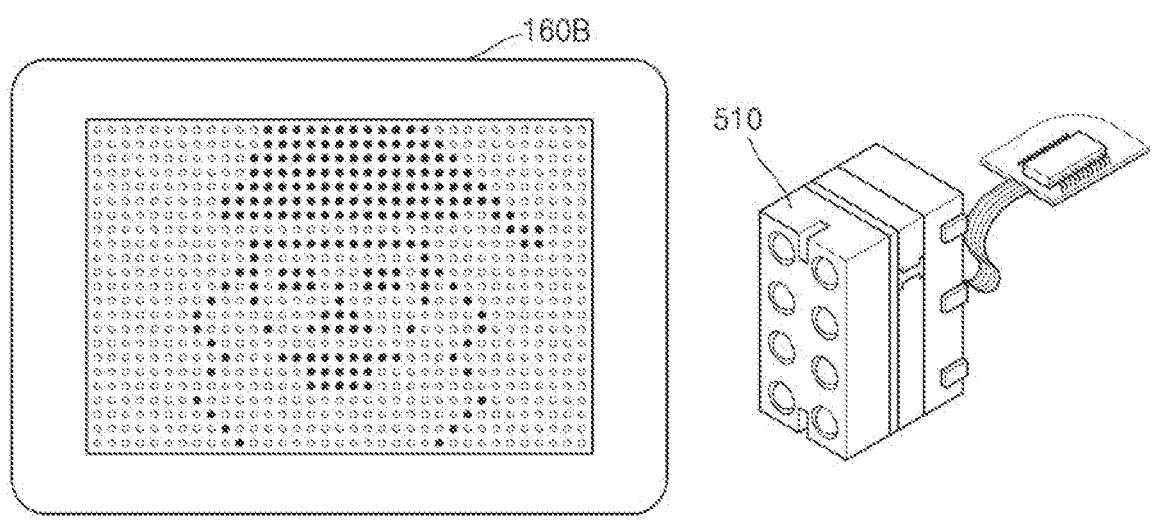
FIG. 5 is a diagram for describing in detail an example of a second input device of FIG. 1.

FIG. 5 is a diagram for describing in detail an example of the second input device described above with reference to FIG. 1.

The second input device 160B illustrated in FIG. 5 is a braille pad, and a visually impaired person may apply a particular input to the kiosk 100 through the second input device 160B. As already described above, the second input device 160B may include a function of outputting information output from the kiosk 100, in addition to the function of applying an input to the kiosk 100. A user, who is a visually impaired person, may recognize a picture of Santa Claus output from the second input device 160B through tactile sense, and as another example, when a route is displayed on the second input device 160B, the user may reach the destination according to the displayed route.

A braille unit module 510 of FIG. 5 is a module for implementing the second input device 160B, and tens to hundreds of braille unit modules 510 may be integrated to constitute one second input device 160B. As illustrated in FIG. 5, the braille unit module 510 may implement braille by controlling eight unit mechanisms to protrude or retract. Here, because the number of unit mechanisms included in the braille unit module 510 is not limited to a particular number, the braille unit module 510 may include fewer or more eight unit mechanisms.

Figure 6:
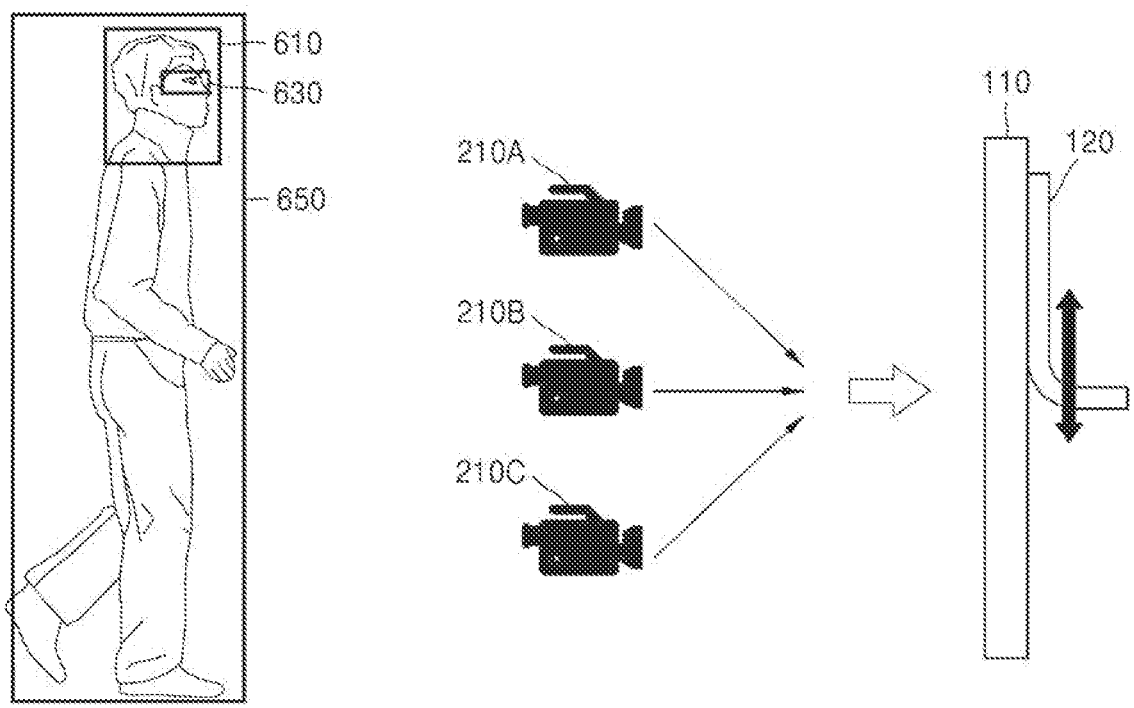
FIG. 6 is a conceptual diagram for describing in detail operation characteristics of a data learning unit of FIG. 4.

FIG. 6 is a conceptual diagram for describing in detail operation characteristics of the data learning unit of FIG. 4.

In FIG. 6, the plurality of cameras 210A, 210B, and 210C are arranged to face any one of the front, a side, and the rear of the kiosk 100, recognizes and photographs characteristic information of a moving object approaching the kiosk 100, and allows the data learning unit 353 of the processor 350 to analyze a result of the photographing.

Here, the characteristic information of the moving object collected by the plurality of cameras 210A, 210B, and 210C may be various.

For example, the data learning unit 353 may analyze images captured by the camera to recognize a face 610 of the moving object, identify frontal information and non-frontal information of the face 610, and determine whether the user intends to use the kiosk 100. In detail, after input images captured by the camera are collected, the data learning unit 353 may detect faces from an input image (i.e., face detection), identify, from the detected faces, major areas, such as an eye, a nose, or a mouth (i.e., shape prediction), and perform deep learning based on information about the identified major areas, to calculate frontal information or non-frontal information of the face of the moving object.

As another example, the data learning unit 353 may analyze images captured by the camera, recognize an eye 630 of the moving object, generate, as information about the eye, iris information or focus information, and determine whether the user intends to use the kiosk 100. In detail, when images captured by the camera are collected, the data learning unit 353 may identify an eye from an input image, enlarge the identified eye area to generate at least one of iris information and focus information based on unique characteristics of an iris, a change in the radius of a pupil, etc., and perform learning based on the generated iris information and focus information to determine whether the moving object is gazing at the kiosk 100. When the moving object approaches the kiosk 100 while continuously looking at it, the data learning unit 353 may determine that the moving object intends to use the kiosk 100.

As another example, the data learning unit 353 may recognize a height 650 of the moving object to determine whether the moving object intends to use the kiosk 100. When it is determined that the height 650 of the moving object is gradually increasing in images captured by the camera, the data learning unit 353 may determine that the moving object is approaching the kiosk 100, and additionally performing learning with respect to the eyes and face of the moving object to determine whether the user intends to use the kiosk 100.

According to another embodiment, after recognizing the front of the moving object, the data learning unit 353 may measure a time period during which the frontal direction of the moving object is maintained, a time period during which the moving object changes its position from facing the camera to facing other than the camera, and a time period during which the moving object changes its position from facing other than the camera to facing the camera, and determine whether the measured values satisfy a preset condition to determine whether the user intends to use the kiosk 100.

Figure 7:
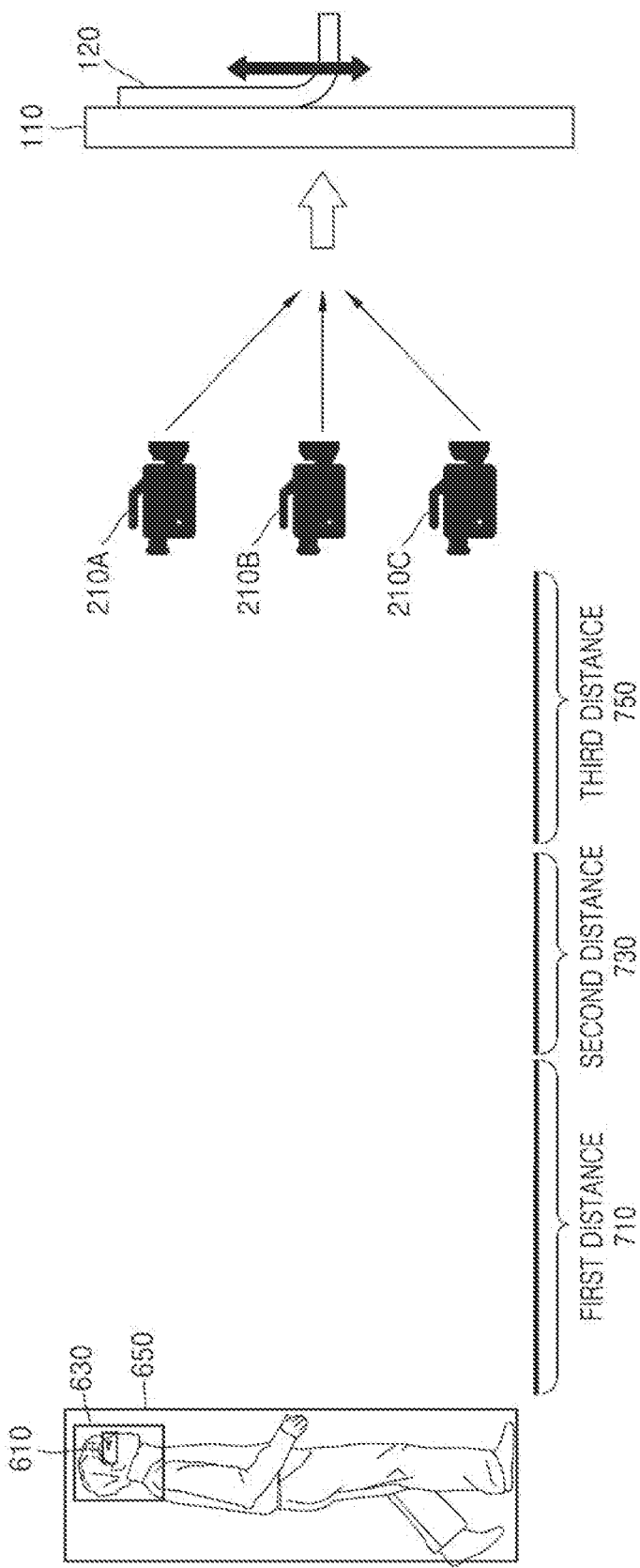
FIG. 7 is a diagram for describing an embodiment further expanded from the embodiment of FIG. 6.

FIG. 7 is a diagram for describing an embodiment further expanded from the embodiment described above with reference to FIG. 6.

According to the embodiment of FIG. 7, the plurality of cameras 210A, 210B, and 210C may photograph a moving object only when the moving object within a preset distance from the kiosk 100 is approaching the kiosk 100, and accordingly, the plurality of cameras 210A, 210B, and 210C may be prevented from wasting power with an unnecessary operation. In addition, the plurality of cameras 210A, 210B, and 210C may photograph the moving object at least twice or more according to a distance by which the moving object has moved to approach the kiosk 100, and allow the processor 350 to analyze captured images, such that the processor 350 more accurately determines whether the user intends to use the kiosk 100. To implement the present embodiment, the kiosk 100 may further include a distance measuring sensor.

When it is determined, through the distance measuring sensor, that the moving object has moved to approach the kiosk 100 by the sum of a first distance 710, a second distance 730, and a third distance 750 (hereinafter, referred to as 'first recognition distance'), the processor 350 may wake up the plurality of cameras 210A, 210B, and 210C operating in a sleep mode, and control them to photograph the moving object for a preset time period.

When it is determined, through the distance measuring sensor, that the moving object has further moved to approach the kiosk 100 by the sum of the second distance 730 and the third distance 750 (hereinafter, referred to as 'second recognition distance'), the processor 350 may wake up again the plurality of cameras 210A, 210B, and 210C operating in the sleep mode, and control them to photograph the moving object for the preset time period.

When it is determined, through the distance measuring sensor, that the distance between the moving object and the kiosk 100 is equal to the third distance 750, the processor 350 may wake up again the plurality of cameras 210A, 210B, and 210C operating in the sleep mode, and control them to photograph the moving object for the preset time period. Here, the third distance 750 may be referred to as 'third recognition distance'.

As described above, the processor 350 may photograph the moving object a total of three times and determine whether the user intends to the kiosk 100, thereby minimizing the power consumption of the plurality of cameras, and the processor 350 may obtain images of the moving object from a plurality of different viewpoints to accurately determine whether the user intends to use the kiosk 100.

In particular, when the moving object comes as close to the kiosk 100 as the second recognition distance and then moves away from the kiosk 100, the cameras do not need to be woken up again by the processor 350, the processor 350 does not need to learn and analyze received images, and thus, the operational efficiency of the kiosk 100 may be maximized.

According to an alternative embodiment, in FIG. 7, the plurality of cameras 210A, 210B, and 210C may intensively photograph characteristic information differently for each of the first recognition distance, the second recognition distance, and the third recognition distance, according to a control signal of the processor 350. For example, the plurality of cameras 210A, 210B, and 210C may capture an image of the height of the moving object at the first recognition distance, an image of the face of the moving object at the second recognition distance, and an image of the eyes of the moving object at the third recognition distance, and transmit the images to the processor 350, and thus, the processor 350 may more accurately determine, by using a difference between the images for the respective viewpoints, whether the moving object (the user) intends to use the kiosk 100.

A case is described above with reference FIG. 7 in which a moving object recognized by the camera matches a user, and hereinafter, a case is described with reference to FIG. 8 in which a moving object recognized by the camera does not match a user.

Figure 8:
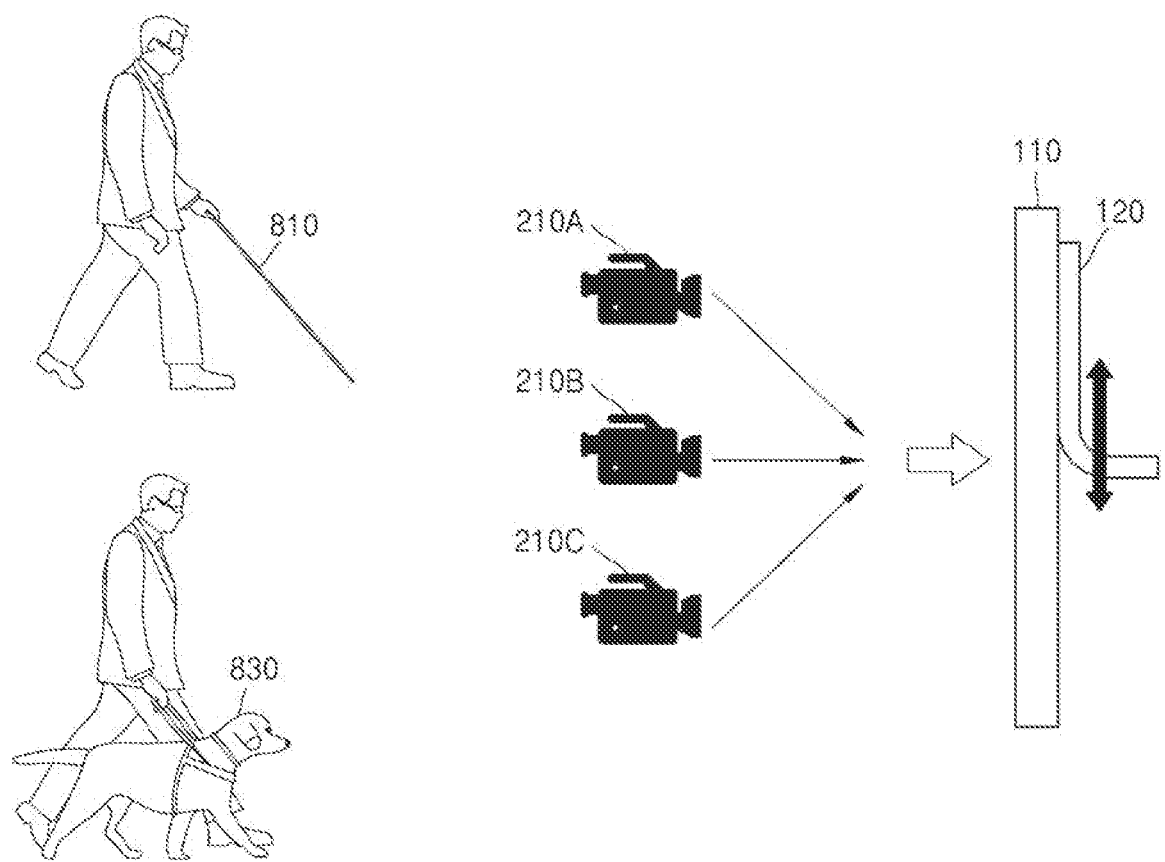
FIG. 8 is a diagram for describing a case in which a moving object does not match a user.

FIG. 8 is a diagram for describing a case in which a moving object does not match a user.

Referring to FIG. 8, a moving object recognized by the camera is an object (or a creature) closer to the camera than is a person (a human). In detail, a walking stick 810 used by a visually impaired person or a guide dog 830 with a visually impaired person is closer to the camera than is the user, and thus may be identified first by the camera, and the kiosk 100 according to the present disclosure may determine, based on characteristic information of the moving object rather than the user, whether the user related to the moving object intends to use the kiosk 100.

In order to implement the embodiment as illustrated in FIG. 8, the processor 350 may further include reference information for accurately extracting and comparing characteristic information of the walking stick 810 and the guide dog 830, and, in particular, with respect to the guide dog 830, the processor 350 may analyze information on the eyes, face, and height of the guide dog 830 to determine whether the user accompanying the guide dog 830 intends to use the kiosk 100. In particular, the walking stick 810 and the guide dog 830 are only indicators for determining whether the user intends to use the kiosk 100, and the height of the kiosk 100 being adjusted by the processor 350 may depend on characteristic information of the user following the walking stick 810 and the guide dog 830.

In the present embodiment, the walking stick 810 or the guide dog 830 is one parameter for the processor 350 to accurately and quickly perform the determination, and allows the processor 350 to perform customized operations of waking up a visually impaired person-specialized module (e.g., a braille pad) operating in a sleep mode to minimize power consumption, and temporarily disabling visual effects (e.g., by a display unit) that are unnecessary for a visually impaired person.

Figure 9:
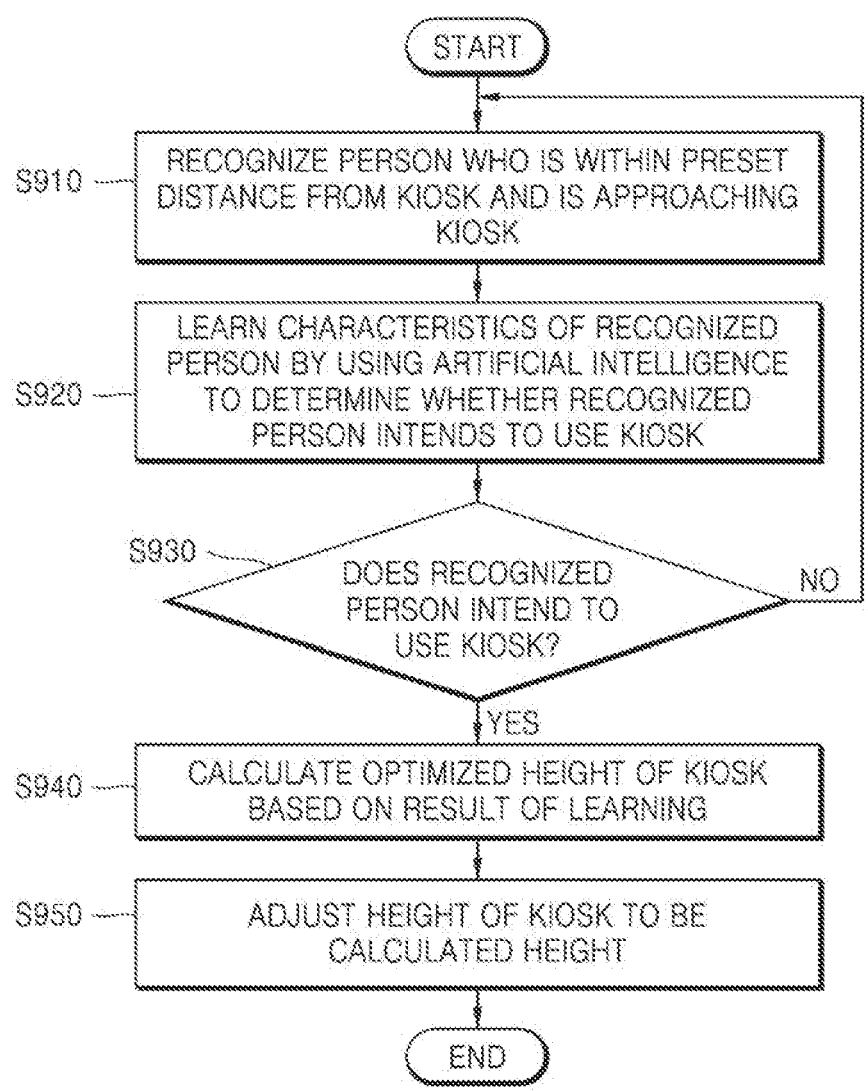
FIG. 9 is a flowchart illustrating an example of a method for controlling a kiosk according to the present disclosure.

FIG. 9 is a flowchart illustrating an example of a method for controlling a kiosk according to the present disclosure.

The method of FIG. 9 may be performed by the kiosk 100 of FIG. 1 or the control system 300 of a kiosk of FIG. 3, and thus, hereinafter, descriptions will be made with reference to FIG. 1 or FIG. 3, and the descriptions provided above with reference to FIG. 1 or FIG. 3 will be omitted.

The camera 310 of the kiosk 100 recognizes a person who is within a preset distance from the kiosk 100 and is approaching the kiosk 100 (S910).

The processor 350 learns characteristics of the recognized person by using artificial intelligence to determine whether the recognized person intends to use the kiosk 100 (S920).

The processor 350 determines whether the recognized person intends to use the kiosk 100 (S930), and when it is determined that the recognized person intends to use the kiosk 100, calculates an optimized height of the kiosk 100 based on a result of the learning (S940).

Thereafter, the processor 350 adjusts the height of the kiosk 100 to be the height calculated in operation S940, to help the person recognized in operation S910 to use the kiosk 100 that is at the most appropriate height (S950).

According to the present disclosure, as the height adjustment function of the kiosk is performed only when necessary, the failure rate of the kiosk may be minimized.

In addition, according to the present disclosure, the kiosk may selectively operate only when a person who intends to use the kiosk approaches, such that power consumption of the kiosk may be minimized.

In addition, according to the present disclosure, it is possible to provide a service optimized for the characteristics of a person using the kiosk, such that the satisfaction of the person using the kiosk may be maximized.

Figure 10:
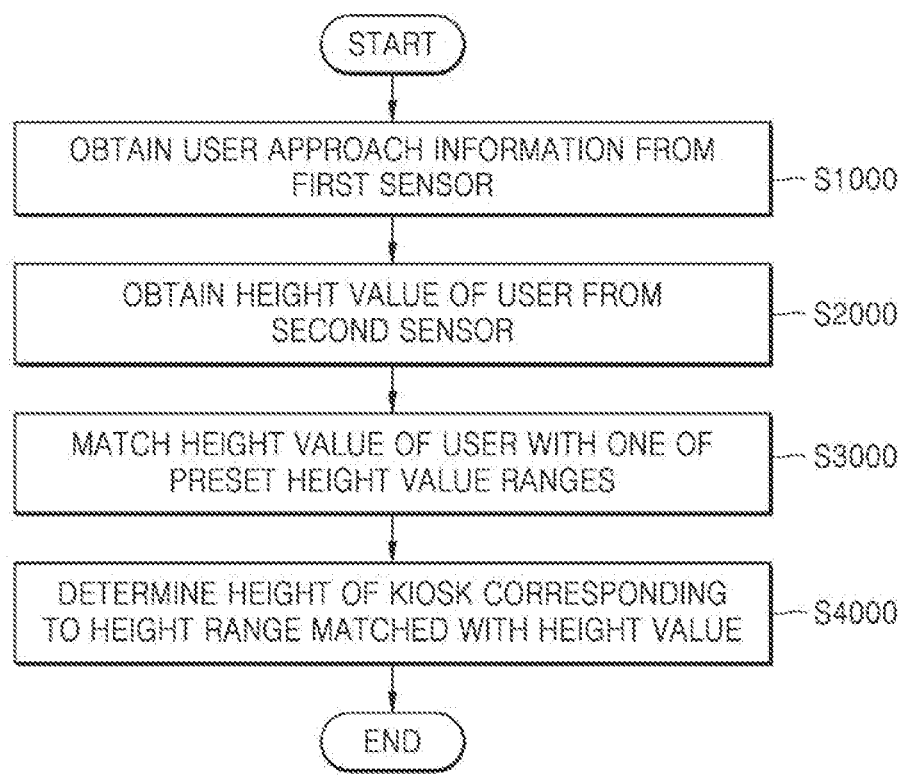
FIG. 10 is a block diagram illustrating a method of determining a height of a kiosk according to an embodiment of the present disclosure.

FIG. 10 is a block diagram illustrating a method of determining a height of a kiosk according to an embodiment.

Referring to FIG. 10, user approach information about a user who is within a preset radius is obtained from a first sensor (S1000).

Thereafter, a height value of the user is obtained from the second sensor (S2000).

Thereafter, the height value of the user is matched with one of preset height value ranges (S3000).

Thereafter, the height of the kiosk corresponding to the height value range matched with the height value is determined (S4000).

First, a processor may obtain, from the first sensor, the user approach information about the user who is within the preset radius (S1000).

Here, the term 'user' includes general users, i.e., adults and children, and users with disabilities, i.e., people with visual impairments, lower extremity disabilities, or intellectual disabilities, and may refer to a person who is within a preset distance radius from the kiosk.

In an embodiment, approach information of a user and the kiosk may include detection information about the user who is within a preset radius obtained from a sensor, and a distance value between the user and the kiosk.

Thereafter, the height value of the user is obtained from the second sensor (S2000).

Each of the first sensor that may obtain the user approach information and the second sensor that may obtain the height value of the user as described above may be one of various sensors currently used (e.g., a camera sensor, an infrared sensor, an ultrasonic sensor, etc.).

Thereafter, the height value of the user is matched with one of the preset height value ranges (S3000).

A plurality of height value ranges for determining the height of the kiosk may be set, and it is preferable to set two or three height value ranges to be matched with the height value of the user.

Thereafter, the height of the kiosk corresponding to the height value range matched with the height value is determined (S4000).

The processor may determine the height of the kiosk corresponding to the height value range matched with the height value. Here, the height of the kiosk may be determined based on the position of an input pad unit provided in the kiosk.

Here, the input pad unit may include a keypad and a braille pad that convert a physical input by the user into an electrical signal and transmit the electrical signal to the processor. The braille pad may be effectively used by a visually impaired user, and outputs braille corresponding to output data processed by the processor, such that the visually impaired user recognizes content output from the kiosk. The braille pad will be described below with reference to FIG. 5.

In addition, a sound input/output device may be included to convert a user voice into an electrical signal, transmit the electrical signal to the processor, and output, as a voice or a sound, output data processed by the processor. Although only the components necessary for the present disclosure are briefly mentioned above, in an actual implementation of the present disclosure, more devices may be included.

In addition, various means for adjusting the height of the kiosk according to a height determined by the processor may be provided inside the kiosk. For example, height adjustment means, such as hydraulic, geared, or linear actuators, and various adjustment means, such as a step motor or a servo motor, may be included.

A kiosk with a height adjustment function has a problem in that it frequent breaks down as its height is constantly changed without being fixed or its height is adjusted according to a user input. According to an embodiment of the present disclosure, it is possible to reduce the failure rate of the kiosk by adjusting the height of the kiosk to be only values corresponding to height value ranges.

In addition, different types of kiosks differ in the position of an input pad unit, and in the method of setting the height of the kiosk, resulting in inconvenience. According to an embodiment of the present disclosure, the processor may determine the height of the kiosk considering the position of the input pad unit, thereby solving such inconvenience.

According to an embodiment of the present disclosure, there may be a case in which the physical height of the kiosk is adjusted but it is still difficult or inconvenient for a user to manipulate the input pad unit, and, for such cases, the following method may be used.

In more detail, in order to determine the height of the kiosk, the processor may obtain the position of the input pad unit, and determine a preset height adjustment value of the kiosk corresponding to the position. Also, the height of the kiosk may be determined by applying the height adjustment value to the height of the kiosk corresponding to the height value range matched with the height value.

First, the processor may check the position of the input pad unit. After approach information and a height value of the user are obtained, the processor may obtain the position of the input pad unit provided in the kiosk, and determine a height of the kiosk corresponding to a height value range matched with the height value. Also, the processor may determine a preset height adjustment value of the kiosk corresponding to the position of the input pad unit.

For example, a height of the kiosk for a height value range may be set based on an input pad unit provided at a lower part of a display. The kiosk height adjustment value may be set based on various positions of input pad units, such as an input pad unit provided at a lower part of the kiosk or an input pad unit provided at the lowermost side of the display.

The processor may obtain the position of the input pad unit provided in the kiosk and determine the kiosk height adjustment value according to the position of the input pad unit. A detailed method will be described below with reference to FIG. 2.

For example, in the kiosk set with a first height value range, a second height value range, and a third height value range with respect to users, the height of the kiosk may be set to a first height, a second height, and a third height corresponding to the respective height value ranges.

Here, the processor determines a kiosk height adjustment value by obtaining the actual position of the input pad unit provided in the kiosk. For example, when the height value range matched with the height value of the user is the third height value range, and the corresponding height of the kiosk is the third height, the processor may obtain the actual position of the input pad unit of the kiosk and finally determine the height of the kiosk by applying, to the third height, the height adjustment value corresponding to the actual position of the input pad unit.

When the height adjustment value corresponding to the actual position of the input pad unit is −10 CM, the processor may determine the height of the kiosk by applying −10 CM to the third height.

The processor may calculate a height difference between the height value of the user and the input pad unit based on the position of the input pad unit, match the height difference value with one of preset height ranges, and determine a kiosk height adjustment value corresponding to the matched height range. Also, the height of the kiosk may be determined by applying the height adjustment value to the height of the kiosk corresponding to the height value range matched with the height value.

In more detail, the processor may calculate a difference value between the height of the user and the height of the input pad unit based on the position of the input pad unit, and match the difference value with one of the preset height ranges. The height difference value may be a height difference between the height of the input pad unit and the height value (the highest point) of the user, or may be a height difference between the height of the input pad unit and an average shoulder height, which is calculated by subtracting, from the height value, an average head size value based on the height value of the user. Alternatively, the height difference value may be a height difference between the height of the input pad unit and an arm length of the user, which is calculated based on the height value of the user.

Also, the processor may match the height difference value with one of the preset height ranges to determine a kiosk height adjustment value corresponding to the height range matched with the height difference value. The preset height ranges and height adjustment values may be set differently according to the height of the kiosk corresponding to the height value range matched with the height value of the user.

The processor may determine the height adjustment value, and finally determine the height of the kiosk by applying the height adjustment value to the height of the kiosk corresponding to the height value range matched with the height value of the user.

For example, when the height value of the user is matched with the first height value range, and the height difference is matched with the second height range, the processor may determine the height of the kiosk by applying, to the height of the kiosk corresponding to the first height value range, the height adjustment value corresponding to the second height range.

Hereinafter, a detailed example of an operation method of a kiosk that may be implemented by an operation of a processor will be described with reference to FIGS. 11 to 14.

Figures 11A, 11B, 11C:
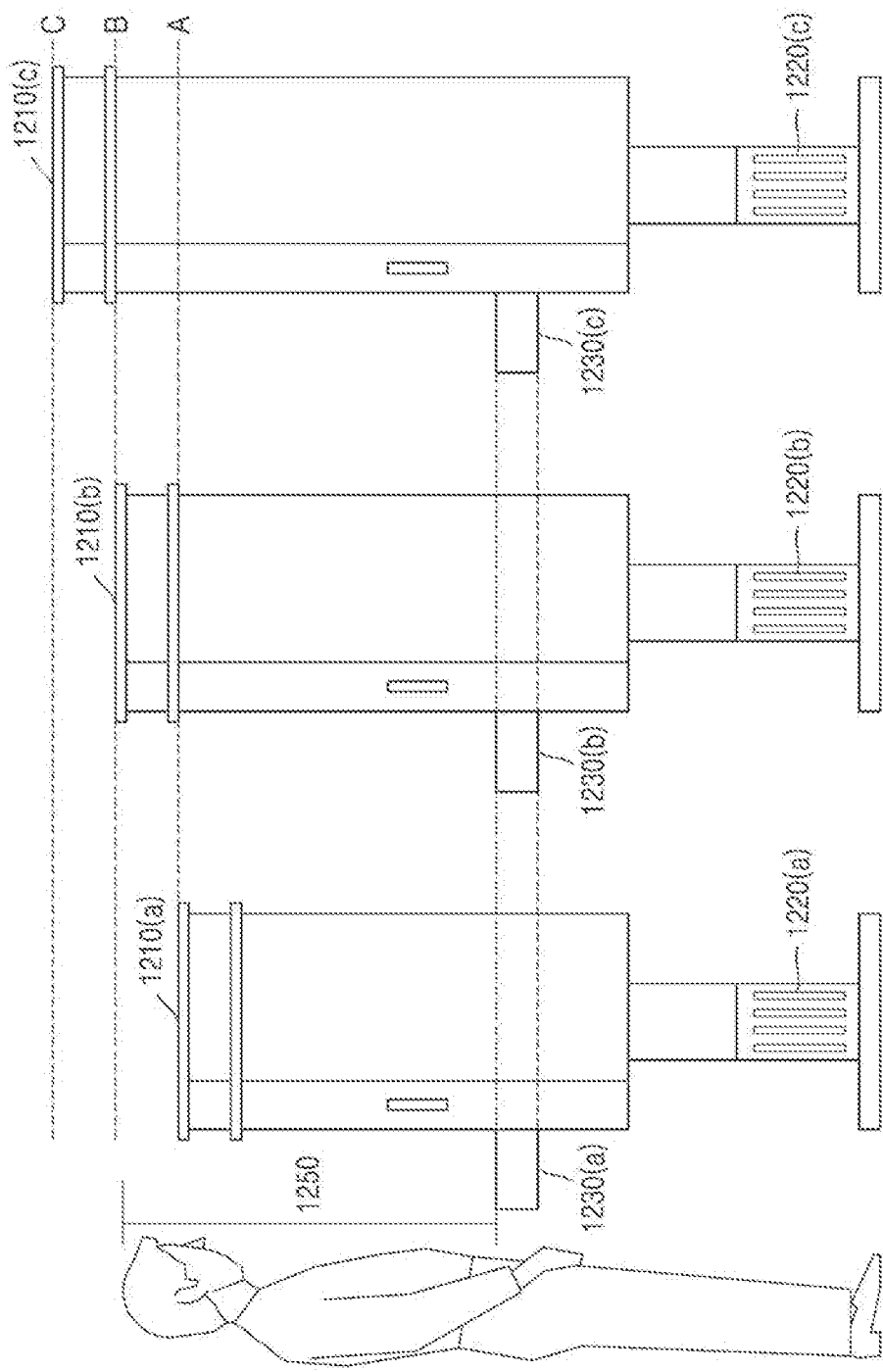
FIG. 11 is a diagram illustrating an example of a kiosk, the height of which is adjusted based on the height of a user and the position of an input pad unit, according to an embodiment of the present disclosure.

FIG. 11 is a diagram illustrating an example of a kiosk, the height of which is adjusted based on the height of a user and the position of an input pad unit, according to an embodiment of the present disclosure.

Referring to FIG. 11, a height value of a user is matched with a height value range, and a height of the kiosk corresponding to the height value range is determined.

Even for different positions of an input pad unit 1230 provided in a kiosk 1210, the height of the input pad unit 1230 may be adjusted to be the same value corresponding to the height value of the user.

In more detail, in determining the height of the kiosk corresponding to the height value range matched with the height value of the user, a processor may obtain the position of the input pad unit and determine a preset height adjustment value of the kiosk corresponding to the obtained position. Also, the height of the kiosk may be determined by applying the height adjustment value to the height of the kiosk corresponding to the height value range matched with the height value.

After the processor determines the height of the kiosk, the height of the kiosk may be adjusted by providing a height adjustment signal to a height adjustment means 1220.

First, referring to (a) of FIG. 11, an input pad unit 1230*a* provided in a kiosk 1210*a* may be provided at a lower part of a display. In more detail, a processor may check that the input pad unit 1230*a* is provided at a lower side of the display and determine a height adjustment value of the kiosk 1210*a*. The processor may determine the height of the kiosk 1210*a* by applying the height adjustment value of the kiosk 1210*a*.

When the height of the kiosk 1210*a* corresponding to the height value range matched with the height value is B, the processor of the kiosk 1210*a* obtains the position of the input pad unit 1230*a*. The processor may determine, by applying the height adjustment value of the kiosk 1210*a*, that the height of the kiosk 1210*a* is to be changed from B to A such that the height of the input pad unit 1230*a* is to be about the height of the user's elbow.

For example, when the height adjustment value of the input pad unit 1230*a* provided at a lower part of the display is −10 CM, the processor may determine that the height of the kiosk 1210*a* is to be (B−10 CM).

Next, referring to (b) of FIG. 11, an input pad unit 1230*b* provided in a kiosk 1210*b* may be provided at the lowermost side of the display. In more detail, a processor may check that the input pad unit 1230*b* is provided at the lowermost side of the display and determine a height adjustment value of the kiosk 1210*b*. The processor may determine the height of the kiosk 1210*b* by applying the height adjustment value of the kiosk 1210*b*.

When a height of the kiosk corresponding to a height value range matched with a height value is B, the processor of the kiosk 1210*b* may obtain the position of the input pad unit 1230*b*. The processor may maintain the height B of the kiosk corresponding to the height value range matched with the height value without applying any preset height adjustment value such that the height of the input pad unit 1230*b* is about the height of the user's elbow.

Finally, referring to (c) of FIG. 11, an input pad unit 1230*c* provided in a kiosk 1210*c* may be provided at the lowermost side of the kiosk 1210*c*. In more detail, a processor may check that the input pad unit 1230*c* is provided at the lowermost side of the display and determine a height adjustment value of the kiosk 1210*c*. The processor may determine the height of the kiosk 1210*c* by applying the height adjustment value of the kiosk 1210*c*.

When a height of the kiosk 1210*c* corresponding to a height value range matched with a height value is B, the processor of the kiosk 1210*c* may obtain the position of the input pad unit 1230*c*, and determine that the height of the kiosk 1210*c* is to be C, which is obtained by increasing, by a preset height adjustment value, the height B of the kiosk 1210*c* corresponding to the height value range matched with the height value. The processor may determine to increase the height of the kiosk 1210*c* such that the height of the input pad unit 1230*c* is about the height of the user's elbow.

For example, when the height adjustment value of the input pad unit 1230*c* provided at the lowermost side of the kiosc 1210*c* is +5 CM, the processor may determine that the height of the kiosk 1210*c* is to be (B+5 CM).

The position of the input pad unit 1230 described above is only an example and does not limit the position of an input pad unit.

Alternatively, the processor may calculate a height difference 1250 between the height value of the user and the height of the input pad unit, match the height difference value with one of preset height ranges, and determine a kiosk height adjustment value corresponding to the matched height range. In addition, the height of the kiosk may be determined by applying the height adjustment value to the height of the kiosk corresponding to the height value range matched with the height value.

Referring to FIG. 11, assuming that a user uses the kiosk 1210*a*, the processor may determine that a height of the kiosk 1210*a* corresponding to the height value range of the user is A. In addition, by calculating the height difference 1250 between the height value of the user and the height of the input pad unit, and matching the height difference with one of preset height ranges, a kiosk height adjustment value corresponding to the matched height range may be determined. For example, when a first height adjustment value is determined, the processor may determine the height of the kiosk by adding the first height adjustment value to the height A of the kiosk. Alternatively, when a third height adjustment value is determined, the height of the kiosk may be determined by subtracting the third height adjustment value from the height A of the kiosk.

Figure 12:
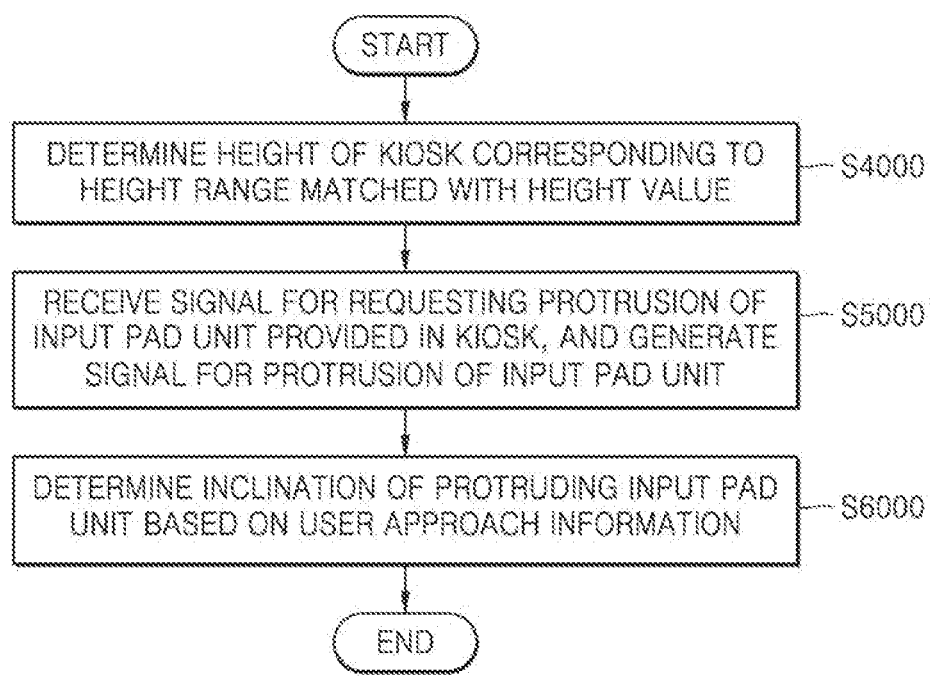
FIG. 12 is a block diagram illustrating an overall operating method of a kiosk according to an embodiment of the present disclosure.

FIG. 12 is a block diagram illustrating an overall operating method of a kiosk according to an embodiment of the present disclosure.

First, a height of the kiosk corresponding to a height value range matched with a height value is determined (S4000).

Thereafter, a signal for requesting protrusion of an input pad unit provided in the kiosk is received, and a signal for protrusion of the input pad unit is generated (S5000).

Finally, the inclination of the protruding input pad unit is determined based on user approach information (S6000).

First, the height of the kiosk corresponding to the height value range matched with the height value may be determined (S4000).

Thereafter, the signal for requesting protrusion of the input pad unit provided in the kiosk is received, and the signal for protrusion of the input pad unit is generated (S5000).

In an embodiment, the signal for requesting protrusion may be generated through a button provided in the kiosk. When a user applies an input to the button provided in the kiosk, the processor receives a request for requesting protrusion of the input pad unit, and generates a signal for protrusion. In addition, there may be a case in which the input pad unit already protrudes, and in such a case, the request for requesting protrusion may be a signal for requesting extension of the length of the protruding input pad unit.

A protrudable means, such as a sliding rail, may be provided on the lower surface of the input pad unit, and the input pad unit may protrude according to a signal for protrusion generated by the processor.

The input pad unit may be provided at a lower part of a display or between a plurality of displays, in the main body of the kiosk.

Thereafter, the inclination of the protruding input pad unit is determined based on the user approach information (S6000).

The processor may determine, based on the user approach information, whether it is necessary to change the inclination of the protruding input pad unit, and, when it is determined that it is necessary to change the inclination, determine the inclination of the protruding input pad unit.

In more detail, when it is determined that the height of the kiosk corresponding to the height value range matched with the height value is the physically lowest height, and the height value of the user based on the approach information is less than or equal to the height of the input pad unit, or the height difference between the height value of the user and the height of the input pad unit is less than a preset value, the processor may determine that it is necessary to change the inclination of the input pad unit.

The processor may determine the angle of the input pad unit such that the angle between a line perpendicular to the display and the input pad unit is within the range of 0° to −30°.

In more detail, in order to determine the angle of the input pad unit, the processor calculates, based on the approach information, an arm length corresponding to the height value of the user and a distance between the user and the protruding input pad. Here, the arm length may be the length of an extended arm of the user toward the input pad unit. The processor may calculate a variable k for cases, such as a case in which the user fully extends his or her arm towards the input pad unit or a case in which the user half extends his or her arm towards the input pad, according to the distance between the user and the protruding input pad unit, and the angle of the input pad unit may be determined by Equation 3 below according to the arm length, the distance between the user and the protruding input pad unit, and the variable k.

$$\frac{\text{Distance between user and input pad unit}}{\text{Arm length}} * k = \quad \text{[Equation 3]}$$

Angle of imput pad unit

In addition, after determining the height of the kiosk, the processor may determine whether there is a change in the approach information and, when there is a change in the approach information, redetermine the height of the kiosk based on the change.

A change in the approach information may occur in a case in which approach information of another user is obtained or the approach information cannot be obtained, but is not limited thereto.

FIG. 13 is a diagram illustrating an interface screen of a display of a kiosk according to whether an input pad protrudes, according to an embodiment of the present disclosure. [00211] (a) of FIG. 13 illustrates an example of a display interface screen when the input pad does not protrude.

A kiosk 400 includes a sensor 410, a display 420, an input pad unit 440, and an input pad unit protrusion request button 430. The input pad unit may be provided between a plurality of displays 420 or at a lower part of one display. In addition, an additional display may be provided on the front surface of the input pad unit. Alternatively, the input pad unit may already protrude in the structure of the kiosk.

FIG. 13 is a diagram illustrating an interface screen of a display of a kiosk according to whether an input pad protrudes, according to an embodiment of the present disclosure.

Referring to (a) of FIG. 13, when the input pad unit 440 does not protrude, the processor may provide output data to the kiosk display 420 and a display provided in the input pad unit 440.

The processor may determine output data 1401 to be provided only to the display 420 and output data 1402 to be provided to the display 420 and the display provided in the input pad unit 440.

In addition, the processor may receive a touch input of the user for the output data 1402 provided to the display 420 as well as a touch input of the user for the output data 1402 provided to the display provided in the input pad unit 440, and process the output data 1402 according to the input of the user.

Referring to (b) of FIG. 13, when the input pad unit 440 protrudes, the processor may determine the data 1401 and data 1403 to be output to the display 420, and provide the data 1401 and the data 1403 to the display 420.

Before the input pad unit protrudes, the processor has provided the output data 1402 to the display provided in the input pad part 440 and arranged on the lower side of the display 420. When the input pad unit 440 protrudes, the processor may provide the output data 1403 only to the display 420.

Also, the processor may receive an input of the user for output data, from an input device (not shown), such as a keypad or a braille pad, provided on the upper surface of the input pad unit 440. The processor may convert output data corresponding to a result of processing by the processor into a voice and braille and provide the voice and the braille to the input device (not shown) provided in the input pad unit.

Figure 14:
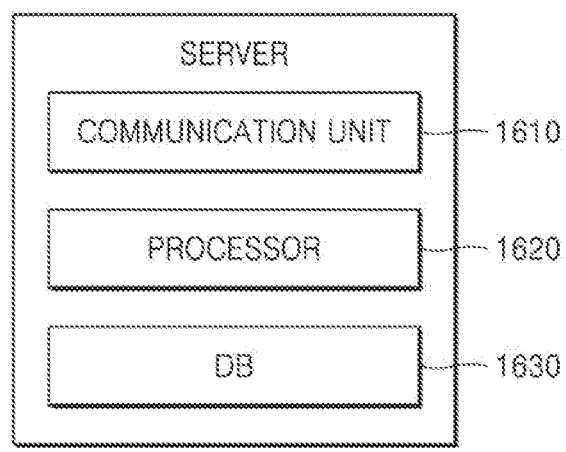
FIG. 14 is a block diagram of a server according to an embodiment of the present disclosure.

FIG. 14 is a block diagram of a server according to an embodiment.

Referring to FIG. 14, the server may include a communication unit 1610, a processor 1620, and a database (DB) 1630. FIG. 14 illustrates the server including only the components related to an embodiment. Therefore, it would be understood by those of skill in the art that other general-purpose components may be further included in addition to those illustrated in FIG. 14.

The communication unit 1610 may include one or more components for performing wired/wireless communication with other nodes. For example, the communication unit 1610 may include at least one of a short-range communication unit, a mobile communication unit, and a broadcast receiving unit.

The DB 1630 is hardware for storing various pieces of data processed by the server, and may store a program for the processor 1620 to perform processing and control. The DB 1630 may store payment information, user information, and the like.

The DB 1630 may include random-access memory (RAM), such as dynamic RAM (DRAM) or static SRAM, read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 1620 controls the overall operation of the server. For example, the processor 1620 may execute programs stored in the DB 1630 to control the overall operation of an input unit, the communication unit 1610, the DB 1630, and the like. The processor 1620 may execute programs stored in the DB 1630 to control the operation of the server. The processor 1620 may control the server described above with reference to FIGS. 10 to 14.

The processor 1620 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

The embodiments of the present disclosure described above may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and be usable by those of ordinary skill in the art of computer software. Examples of the computer program may include not only machine code, such as code made by a compiler, but also high-level language code that is executable by a computer by using an interpreter or the like.

Particular executions described herein are merely examples and do not limit the scope of the present disclosure in any way. For the sake of brevity, conventional electronics, control systems, software and other functional aspects of the systems may not be described in detail. Furthermore, line connections or connection members between elements depicted in the drawings represent functional connections and/or physical or circuit connections by way of example, and in actual applications, they may be replaced or embodied with various suitable additional functional connections, physical connections, or circuit connections. Moreover, no item or component is essential to the practice of the present disclosure unless the item or component is specifically described as "essential" or "critical."

The term 'the' and other demonstratives similar thereto in the specification of the present disclosure (especially in the following claims) should be understood to include a singular form and plural forms. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. In addition, various modifications, combinations, and adaptations will be readily apparent to those skilled in the art without departing from the following claims and equivalents thereof.

According to the present disclosure, as a height adjustment function of a kiosk is performed only when necessary, the failure rate of the kiosk may be minimized.

In addition, according to the present disclosure, the kiosk may selectively operate only when a person who intends to use the kiosk approaches, such that power consumption of the kiosk may be minimized.

In addition, according to the present disclosure, it is possible to provide a service optimized for the characteristics of a person using the kiosk, such that the satisfaction of the person using the kiosk may be maximized.

According to the present disclosure, there may be provided a kiosk capable of determining a height according to physical information of a user.

According to the present disclosure, there may be provided a kiosk capable of determining a height of the kiosk considering physical information of a user and the position of an input pad.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of controlling an intelligent barrier-free kiosk, the method comprising:
   recognizing a moving object, which is within a preset distance from the kiosk and is approaching the kiosk;
   learning characteristic information of a recognized moving object based on a multi-frame video;
   determining, based on a result of the learning, whether a user related to the moving object intends to use the kiosk; and
   based on determining that the user intends to use the kiosk, changing a height of the kiosk,
   wherein the characteristic information of the recognized moving object comprises information about a frontal direction of the recognized moving object and information about a non-frontal direction of the recognized moving object,
   wherein the determining of whether the user intends to use the kiosk comprises determining whether the user intends to use the kiosk based on a frame number ratio of the recognized moving object, and
   wherein the frame number ratio is a ratio between a number of frames corresponding to the information about the frontal direction of the recognized moving object in the multi-frame video and a number of frames corresponding to the information about the non-frontal direction of the recognized moving object in the multi-frame video.

2. The method of claim 1, wherein the learning comprises learning the characteristic information based on information obtained by photographing the moving object by using at least one camera included in the kiosk.

3. The method of claim 1, wherein the learning comprises learning the characteristic information based on information obtained by photographing the moving object by using at least one of cameras installed on a front and a side of the kiosk.

4. The method of claim 1, wherein the moving object is the user, and
   the recognized characteristic information of the moving object is a height of the user.

5. The method of claim 1, wherein the moving object is the user, and
   the recognized characteristic information of the moving object is information about eyes of the user.

6. The method of claim 5, wherein the information about the eyes comprises at least one of information about an iris and focus information with respect to the kiosk.

7. The method of claim 1, wherein the changing of the height comprises:
   calculating, based on the result of the learning, a height optimized for the user; and
   adjusting the height of the kiosk to be the calculated height.

8. A computer-readable recording medium having recorded thereon a program for executing the method of claim 1.

9. An intelligent barrier-free kiosk comprising:
   a camera; and
   a processor,
   wherein the camera generates a multi-frame video about a moving object,
   wherein the camera is configured to recognize and photograph the moving object, which is within a preset distance from the kiosk and is approaching the kiosk,
   wherein the processor is configured to learn characteristic information of the recognized moving object, determine, based on a result of the learning, whether a user related to the moving object intends to use the kiosk, and, based on determining that the user intends to use the kiosk, change a height of the kiosk,
   wherein the characteristic information of the recognized moving object comprises information about a frontal direction of the recognized moving object and information about a non-frontal direction of the recognized moving object, and
   wherein the determining of whether the user intends to use the kiosk comprises determining, based on a frame number ratio of the recognized moving object, whether the user intends to use the kiosk, and wherein the frame number ratio is a ratio between a number of frames corresponding the information about the frontal direction of the recognized moving object in the multi-frame video and a number of frames corresponding to the information about the non-frontal direction of the recognized moving object in the multi-frame video.

\* \* \* \* \*